United States Patent [19]

Thibault

[11] Patent Number: 4,951,445
[45] Date of Patent: Aug. 28, 1990

[54] HANDLING DEVICE AND ITS APPLICATION TO A CONDITIONING INSTALLATION

[76] Inventor: Jacques G. A. Thibault, 35, rue Robert Legeay, F-94000 Creteil (Val de Marne), France

[21] Appl. No.: 97,961

[22] PCT Filed: Dec. 23, 1986

[86] PCT No.: PCT/FR86/00444
§ 371 Date: Nov. 3, 1988
§ 102(e) Date: Nov. 3, 1988

[87] PCT Pub. No.: WO87/03838
PCT Pub. Date: Jul. 2, 1987

[30] Foreign Application Priority Data
Dec. 24, 1985 [FR] France ................ 85 19144

[51] Int. Cl.$^5$ .............. B25J 15/00; B65B 43/18; B65B 51/06
[52] U.S. Cl. ........................... 53/167; 53/137; 53/251; 53/374; 53/564
[58] Field of Search ............ 53/537, 538, 564, 137, 53/251, 250, 374, 167; 493/316, 313, 317

[56] References Cited

U.S. PATENT DOCUMENTS

| | | | |
|---|---|---|---|
| 3,410,050 | 11/1968 | Bell | 53/538 |
| 4,194,442 | 3/1980 | Martelli | 493/316 |
| 4,720,958 | 1/1988 | Wright et al. | 53/537 X |

FOREIGN PATENT DOCUMENTS

| | | |
|---|---|---|
| 7721226 | 2/1979 | France . |
| 2553327 | 4/1985 | France . |
| 1461432 | 6/1974 | United Kingdom . |
| 2000739 | 7/1978 | United Kingdom . |

Primary Examiner—James F. Coan
Attorney, Agent, or Firm—Browdy and Neimark

[57] ABSTRACT

A gripping head, adapted to be mounted on a handling device equipped with a carriage, of the type comprising a shaft linking the gripping head to the carriage and a first gripping tool such as an axial gripping device, a suction device for example, adapted to grip an object in prolongation of the shaft, and which is also equipped with at least one other packaging tool, preferably a lateral gripping device such as another suction device or reusing the same suction device after pivoting perpendicularly to the shaft.

Application notably in packing carboard boxes and packaging loose materials, or objects such as bottles or canned foods or cans.

11 Claims, 7 Drawing Sheets

HANDLING DEVICE AND ITS APPLICATION TO A CONDITIONING INSTALLATION

The present invention concerns a gripping head and/or work head intended to equip a handling device with several degrees of freedom. It also concerns a handling device equipped with this head; it further concerns a packaging installation (for example an installation for packing cardboard boxes) comprising such a handling device.

There are already known automatic handling devices with 4, 5 or 6 degrees of freedom. They are generally intended to perform awkward, difficult tasks with great precision.

There is also known an automatic handling device in accordance with French patent No. 77.21226 dated July 8 1977 permitting extensive degrees of travel. This device, well suited to palletizing tasks, comprises a horizontal arm which can move transversely in relation to itself, along which moves a carriage carrying a work head (or work or gripping hand) adapted to rotate about a vertical axle.

Through the versatility of its movements and through its design, this automatic handling device, or robot, was found to be capable in principle of performing tasks, sometimes difficult, other than palletizing, thus replacing many highly specialized, different existing machines. To accomplish this necessitates mounting on the device a work hand or head the structure of which is chosen according to the tasks to be performed.

The object of the present invention is a work head or hand adapted to perform a number of functions. More particularly the object of the invention is a work head advantageously adapted to perform individual packaging tasks for packages or loose materials; it may concern for example, in the case of packaging in cardboard boxes, the performance of all or some of the following operations:

picking up and folding (shaping) cardboard boxes,
closing the bottoms of cardboard boxes, boxing and filling cardboard boxes or compartments,
closing cardboard boxes at the top, and
palletizing.

Another object of the invention is a handling robot, notably adapted to perform packaging tasks through the use of one or more multiple function work heads.

Another object of the invention is a packaging installation comprising a robot with four degrees of freedom equipped with a multiple function head, and various processing modules or stations disposed in the space through which the head can move, or wherein each module or each station is associated with at least one individual packaging operation.

The invention proposes a gripping head for a handling device comprising a support, of the type with a shaft linking said gripping head to said support, and a first packaging tool consisting of an axial gripping device adapted to grip an object in prolongation of said shaft, wherein said gripping head comprises at least one other packaging tool. Such heads or hands are notably adapted to perform various successive packaging operations involving gripping, by suction for example (or even by mechanical clamping), reshaping of containers (in particular opening cardboard boxes and folding their flaps) and/or standard handling operations (boxing, packing, palletizing-unpalletizing ...) The concept of packaging tool in this context covers any tool intended to act upon packaging (cardboard box, packing case ...) with a view in particular to gripping, shaping and closing it.

According to a preferred embodiment of the invention, said other packaging tool is a lateral gripping tool adapted to grip an object (packaging) transversely to said shaft.

According to advantageous features of the invention, the lateral and axial gripping devices comprise a common suction device which can pivot (through 90° in practise) or two juxtaposed suction devices disposed at right angles; one of said suction devices advantageously contains individual gripping parts such as suckers. According to a preferred feature of the invention said head comprises a closing tool consisting for example of an adhesive paper or gum application assembly, and/or a frame for folding the top flaps of a cardboard box. Such a head is advantageously adapted to be equipped selectively with tools appropriate to the tasks to be performed, for example storage on a shelf, and capable of being changed automatically by the robot itself.

Said other packaging tool can also consist of said closing tool and/or said frame.

The invention also consists of a handling device of the type comprising a horizontal arm adapted exclusively to move transversely in relation to itself, along which is mounted a sliding carriage on which is mounted said gripping head pivoting about a vertical axle and comprising a first packaging tool consisting of an axial gripping device, wherein said head comprises another packaging tool. This may be for example a lateral gripping device. The combination of adaptability and versatility of movement of the robot in accordance with cited French patent No. 77.21226, and the multiple functions which a head of the above mentioned type allows, is particularly well suited to the performance of a wide variety of industrial operations. Such a robot is advantageously adapted to change the work head itself.

The invention also consists of a packaging installation wherein:

a robot comprising a horizontal arm moving transversely in relation to itself, along which slides a carriage on which is mounted pivoting a work head equipped with a first packaging tool consisting of a vertical gripping device and at least a second packaging tool,
a store of flat folded cardboard boxes accessible to the head and
a cardboard box filling station.

Said installation is an application of the abovementioned handling device particularly suited to cardboard box packaging.

In a preferred embodiment this installation also comprises folding and gumming stations for the bottom flaps of cardboard boxes, and/or folding and gumming stations for the top flaps and/or a palletizing station.

The objects, characteristics and advantages of the invention will emerge from the following description given by way of non-limiting example only and with reference to the appended drawings.

Figure 1:
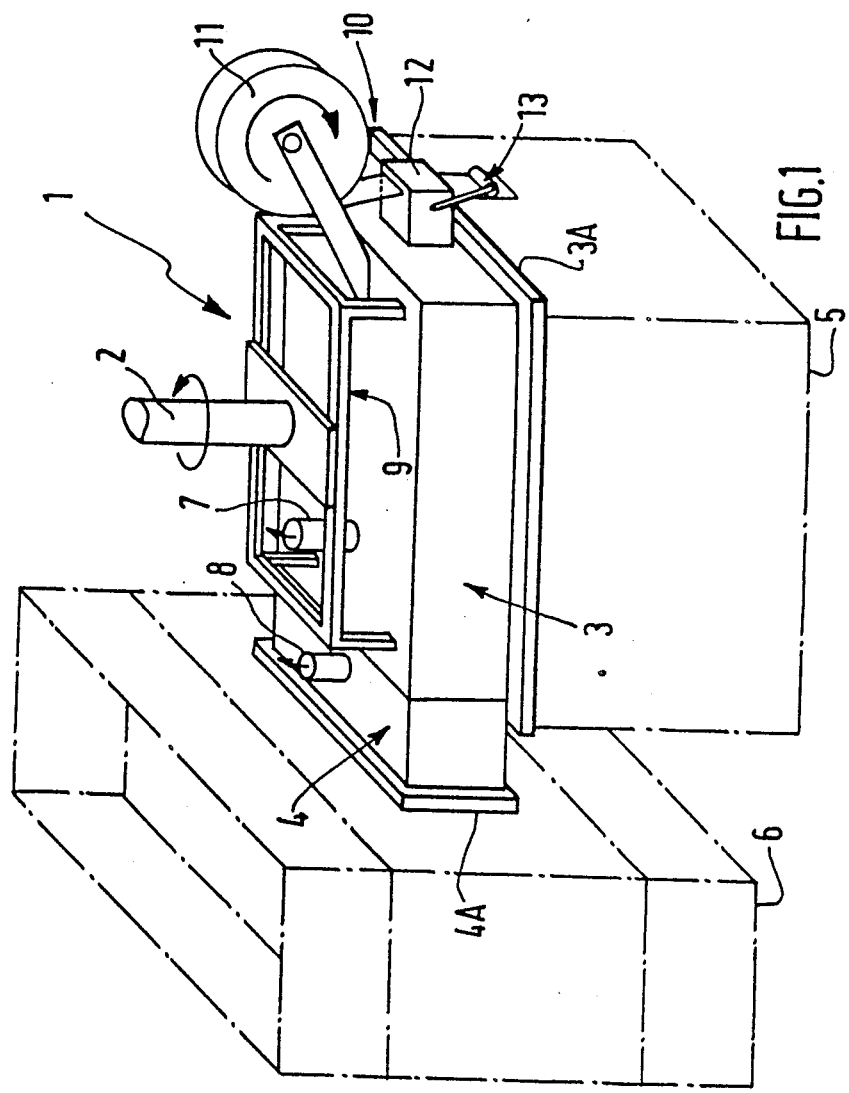
FIG. 1 is a view in perspective of a work head in accordance with the invention.

As shown in FIG. 1 by way of example a work head 1 (which may also be referred to as a work, packaging or processing hand) in accordance with the invention comprises a shaft 2, designed to be engaged in a mobile support with which a robot (polar or cartesian) is equipped, an axial gripping device 3 and a lateral gripping device 4.

The work head 1 is adapted to be mounted pivoting about said shaft 2 (generally vertical) and the axial gripping device 3 is a device adapted to grip an article (or a package, box ...) 5 disposed in prolongation of the shaft 2 whilst the lateral gripping device 4 is a device adapted to grip an article, package or box 6, in a transverse direction perpendicualar to the shaft 2 and the axis of rotation which it generates.

These axial 3 and lateral 4 gripping devices consist of two separate but attached suction devices, connected by conduits 7 and 8 to a suction source (not shown). These suction devices consist of substantially parallelepipedal chambers which in combination determine a substantially parallelepipedal space, the sides of which are either parallel or perpendicular to the shaft 2. The axial suction device 3 is open on a side perpendicular to said shaft and is bordered by an application ring 3A while the lateral suction device 4 is open on a side parallel to the shaft 2 and is also edged with an application flange 4a. In a variant not shown these devices are separated by a 45° partition.

The shaft 2 is linked to the gripping devices 3 and 4 by a frame 9.

On one side of the axial suction device 3, opposite the suction device 4, is disposed a packaging accessory system 10, consisting of an adhesive paper application and gumming assembly, comprising a roll of paper 11, a humidifier 12 across which the paper passes and an applicator roller 13 equipped with a blade. These three elements are substantially aligned parallel to the back of the lateral suction device 4.

Figure 2:
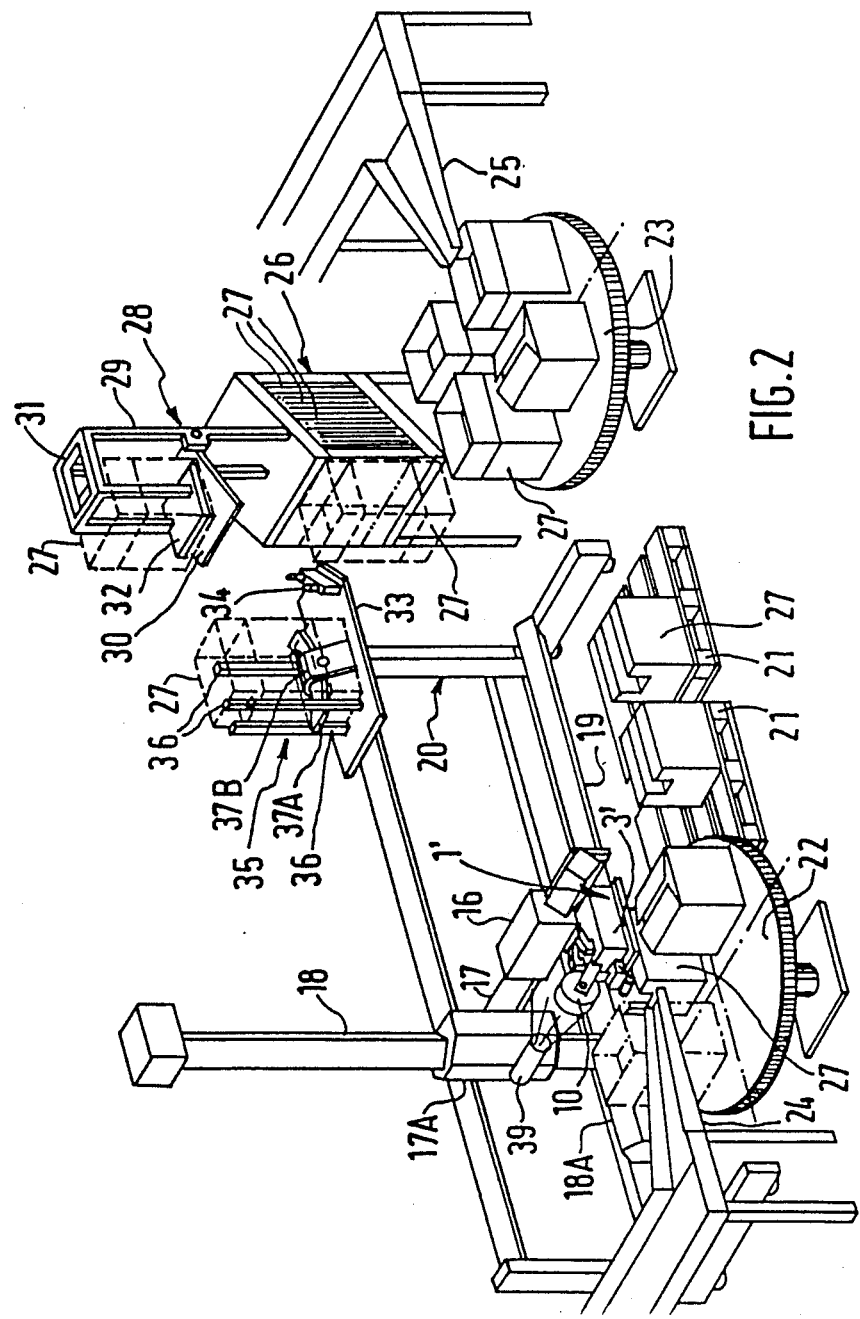
FIG. 2 is a view in perspective of a packaging installation in accordance with the invention, utilizing a work head similar to that in FIG. 1.

FIG. 2 shows a packaging installation 15 utilizing a work head 1' altogether similar to the head 1 in FIG. 1, except that the frame linking the shaft and axial suction device 3' is in the form of a cross.

Said head 1' is mounted pivoting about its vertical shaft in a carriage 16 which slides along a horizontal arm 17 adapted to move transversely in relation to itself (but not along its axis). Said arm is integrally attached to a sleeve 17a adapted to slide along a vertical pole 18 itself integrally attached to a sleeve 18A adapted to slide along a horizontal beam 19 solidly attached to a fixed frame 20. The head 1' is in this way carried by the carriage of a robot in accordance with previously cited French patent No. 77.21226. To make the figure readily understandable, associated control and drive means are not shown.

In the space through which the arm 17 can move transversely are disposed two pallets 21 and two pivoting tables 22 and 23. Loose material feed channels 24 and 25 overhang these tables.

On one side of the space through which the arm 17 can move are disposed a store 26 of vertical cardboard boxes 27 folded flat with their flaps extending vertically.

Above this store is disposed a station 28 for closing the bottoms of the boxes, comprising vertical bars 29, on which is articulated a pivoting plate 30, connected at their upper ends to a bracket 31 carrying a horizontal plate 32 smaller in dimensions than the bottom of an unfolded cardboard box 27 (shown in dotted line). Under the effect of appropriate control means (not shown) the pivoting plate 30 can move into a horizontal position just below the horizontal plate 32.

On one corner of the frame 20 of the robot is fixed a deck 33 on which are disposed gumming nozzles 34 and a bottom shaping station 35 comprising vertical stops 36 defining a lateral support dihedron for cardboard boxes at the bottom part of which are disposed folding guides 37 for folding the bottom flaps of a box. These guides consist of two long curved plates disposed in the form of a cross one of which 37A has its concave part turned upwards and the other, 37B, disposed above the first, has its concave part turned downwards.

FIG. 2 also shows various cardboard boxes 27 in various stages of being shaped (26, 28 and 35), being filled and being closed (on turntables 22 and 23) and being palletized (on pallets 21).

These boxes 27 are handled or manipulated in turn by the various parts making up the work head 1'.

The head 1' is first moved to the store 26 so that its lateral suction device is applied against a flat cardboard box. Through a vacuum effect, this suction device grips the box and by moving back causes the box to be unfolded, the flaps remaining vertical. The head 1' is then moved and positioned to bring the box laterally against the bars 36. By lowering onto the guides 37, the large flaps are maintained vertical while the small flaps are folded inwards. The head is then moved to bring these small flaps opposite the gumming nozzles 34 which coat them with gum. The tilting plate 30 being in the vertical position, the head is moved to bring these flaps against the fixed plate 32. By pivoting to a horizontal position, the tilting plate 30 applies the large flaps against these small flaps coated with gum, thus closing the bottom of the box.

This box is then placed and left on one of the pivoting tables where it is rotated through 90 degrees and filled with the loose material poured through one of channels 24 or 25. The head 1' is then maneuvered above the box so as to fold to the horizontal position the top flaps of the box by appropriate movements of the flange of the axial gripping suction device. Through the assembly 10 adhesive paper is then applied to close the box (it is this operation which is shown in FIG. 2).

The axial suction device 3' is then applied to the top of the box and partial vacuum applied to grip the box. The box is then advantageously positioned opposite a printing device 39 (ink jet, laser or labeller ... for example) carried by the sliding sleeve 17A for example. The box is finally positioned appropriately on a pallet 21.

Figure 3:
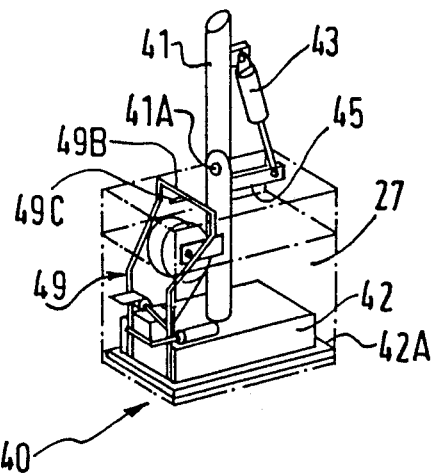
FIG. 3 is a view in perspective, in a first configuration, of another work head in accordance with the invention.
Figure 4:
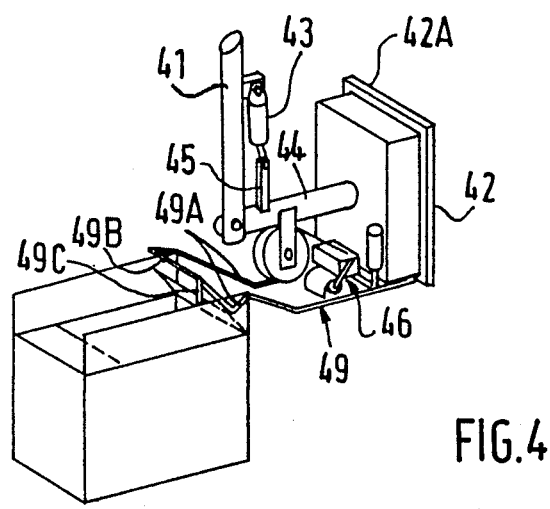
FIG. 4 is a view in perspective of said other work head in a second configuration.

FIGS. 3 and 4 illustrate another embodiment of a gripping head in accordance with the invention.

This head 40 similarly comprises a link shaft 41 rotating with a carriage, an axial gripping device and a lateral gripping device.

It differs from the head in FIG. 1 in that these axial and lateral gripping devices comprise a similar gripping part 42 but this gripping part is articulated on the shaft 41 about a transverse axle 41A, and is under the control of control means 43 which determine the configuration of the head.

As in FIG. 3, the gripping part 42 is a substantially parallelepipedal suction device one open side of which is edged with a flange 42A. To make the figure readily understandable, no flexible conduit connecting to an appropriate suction source is shown.

At the back of this suction device is fixed a bar 44 articulated on the shaft 41 to which is connected a crosspiece 45 the end of which is the point of action of a pneumatic (or preferably hydraulic) actuator, which is also attached to the shaft 41, constituting said control means 43.

When the actuator is extended, the suction device 42 can act as an axial gripping device (FIG. 3) whilst when the actuator is retracted, the suction device 42 acts as a lateral gripping device (FIG. 4).

As previously, this head is advantageously equipped with an adhesive paper application and gumming assembly 46 the humidifier 47 and applicator roller 48 of which are substantially aligned parallel to the back of the suction device 42.

Along one side of this suction device, preferably close to said assembly 46, is attached a frame 49 for folding the flaps which also constitutes a packaging tool. This frame comprises two arms 49A which, initially parallel close to the suction device, then move apart being situated in an inclined plane approaching the axis of the bar 44, then in a plane parallel to it. These diverging arms 49A are connected at their ends to a link arm 49B from which extends substantially in the middle a finger 49C disposed transversely and opposite said bar 44.

This head or hand 40 is utilized in similar fashion to that in FIG. 1, except that the structure of said hand means that the bottom closing station 28 in FIG. 2 is no longer required. As shown in FIG. 3, this head can be inserted inside the box and, when closing the bottom of the box, act as the horizontal plate 32 shown in FIG. 2, by pressing against a plate (not shown), for example tilting like the plate 30 in FIG. 2, or against another means of support.

The frame 49 is advantageous for folding the top flaps of a box. When the head 40 moves to the right, the finger 49C folds the small lefthand flap horizontally. When the head moves to the left, this finger folds the small righthand flap whilst the diverging arms force the large flaps to fold. A further longitudinal movement enables the adhesive paper to be applied to these large flaps so as to close the box. In a variant not shown an articulated lever system simultaneously folds the small flaps before the frame starts to fold the large flaps.

Figure 5:
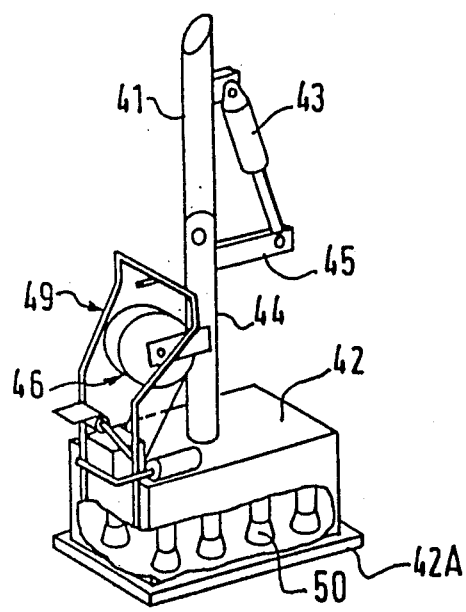
FIG. 5 is a view in perspective, similar to FIG. 3, of a variant of the work head in FIGS. 3 and 4.

FIG. 5 shows a more sophisticated version of the head 40 in FIGS. 3 and 4 in which the individual gripping elements 50 are disposed inside the suction device 42; these elements appear by means of partial wrenching of the lateral skirt of the suction device 42. These elements are advantageously hubs or nozzles adapted to grip individually objects such as cans or bottles.

Figure 6:
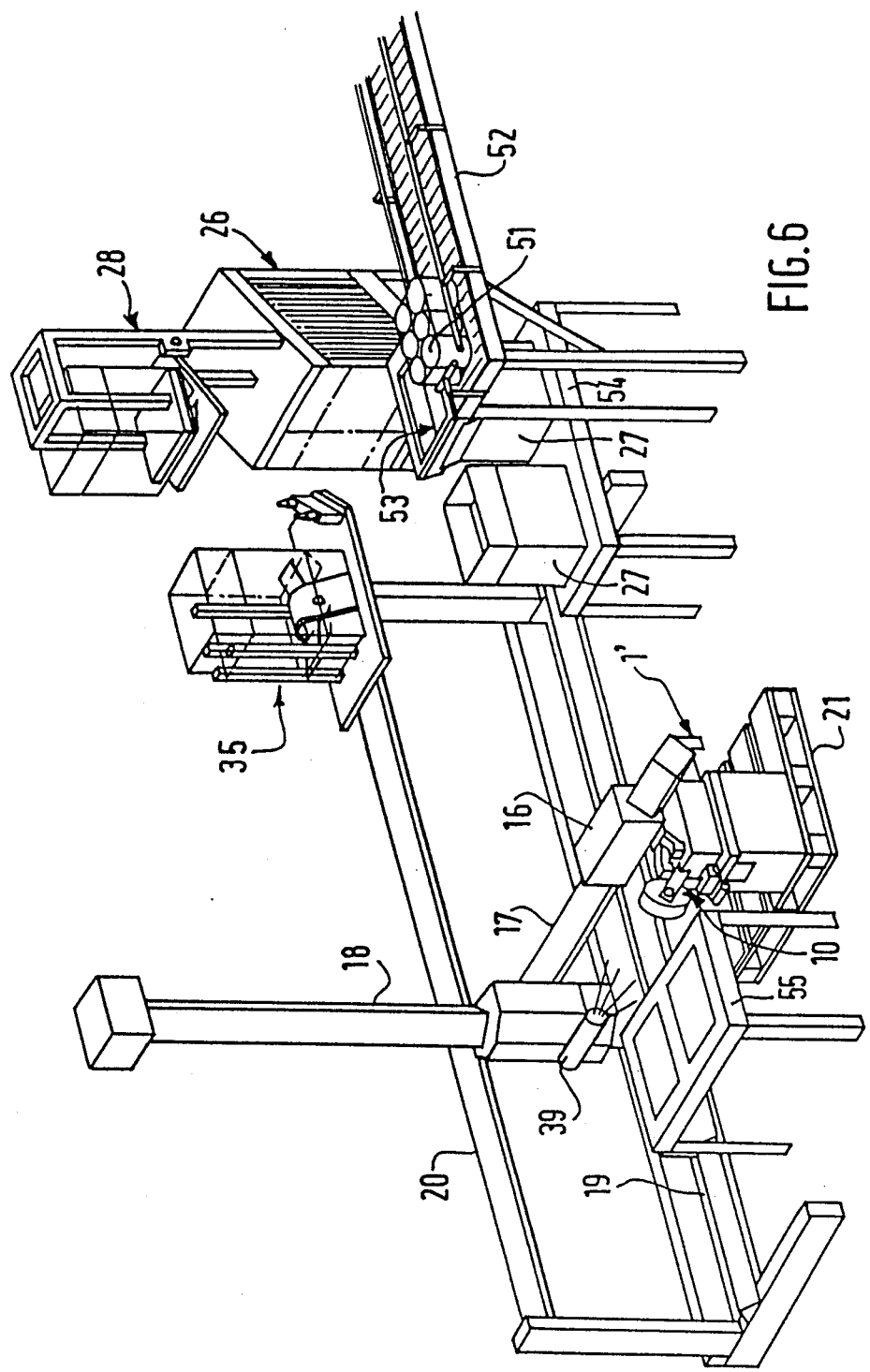
FIG. 6 is a view in perspective, similar to FIG. 2, of another packaging installation in accordance with the invention.

The advantage of such individual gripping elements can be seen in FIG. 6 which shows an installation for packing cardboard boxes, not with loose materials but with objects 51 such as canned foods.

As in FIG. 2, this installation comprises a robot with a head 1', an arm 17, equipped with a closing device 10, a pole 18, a beam 19 carried by a frame 20, a store 26, stations 28 and 35 and pallets 21. Individual gripping elements not shown in the figure are disposed inside the axial suction device 3'.

The objects 51 to be packed are brought by a conveyor 52 beside which is disposed a hopper 53. The formed boxes are placed on a table 54 then pushed under the hopper before being packed with the objects 51.

A table 55 of accessories is advantageously provided to store replacement work heads or tools to be mounted selectively on the same head.

Figure 8:
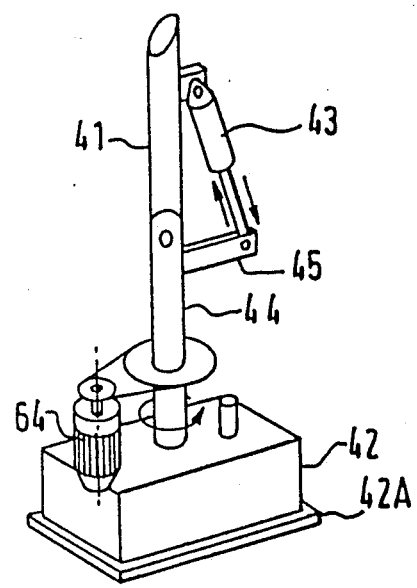
FIG. 8 is a view in perspective of the work head of the installation in FIG. 7.
Figure 7:
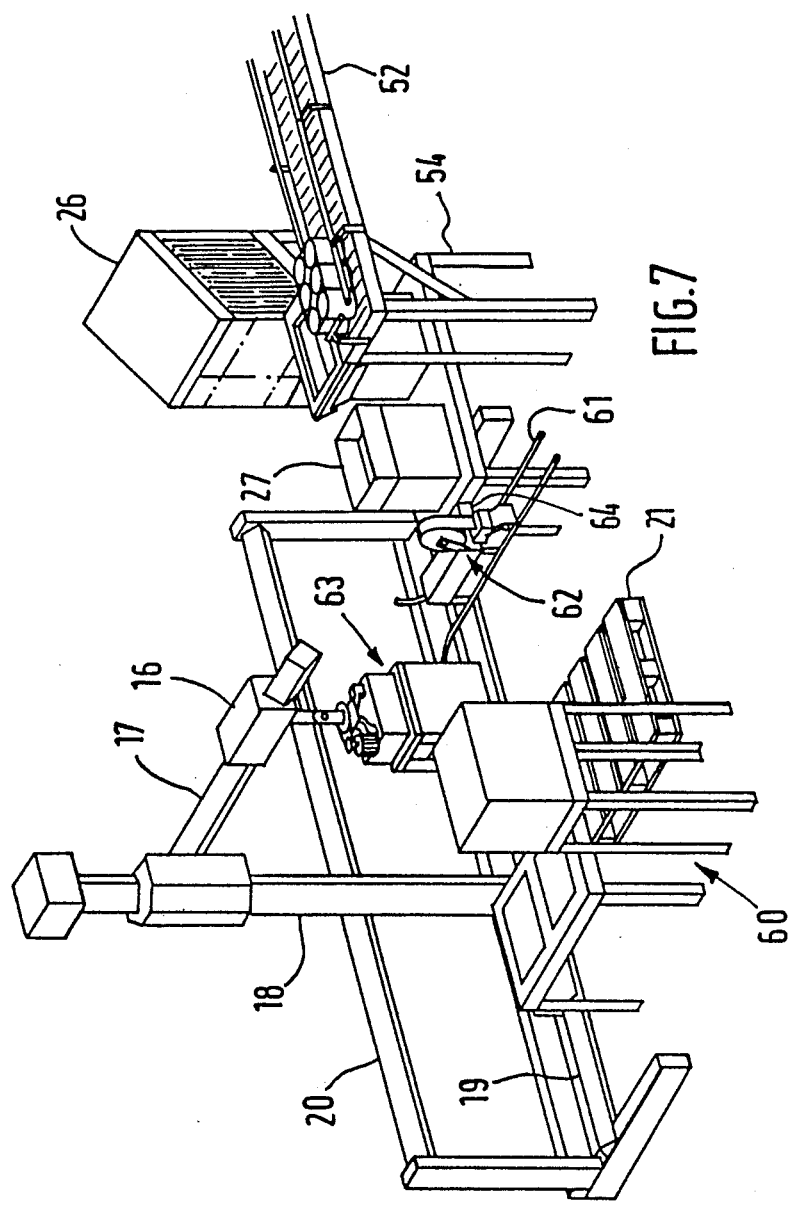
FIG. 7 is a view in perspective of another installation in accordance with the invention.

FIG. 7 shows an installation similar to that in FIG. 6 except that it has a box marking station 60 (using any appropriate means), a flap folding frame 61 and a closing device 62 which instead of being carried by the head 63 are attached in a predetermined position, carried by an extension 64 of the table 54. This head 63 is shown to larger scale in FIG. 8. It is similar to that in FIGS. 3 and 4 except that it has neither frame nor closing device but the suction device 42 is rendered mobile in rotation with respect to the shaft section 44 bY rotation drive means 64. This enables the frame 61 and the closing device 62 to be used for gumming both the bottom flaps and the top flaps of a box: this is accomplished by rotating the suction device about the bar 44 in the configuration in FIG. 4 to overturn an empty box.

Figure 9:
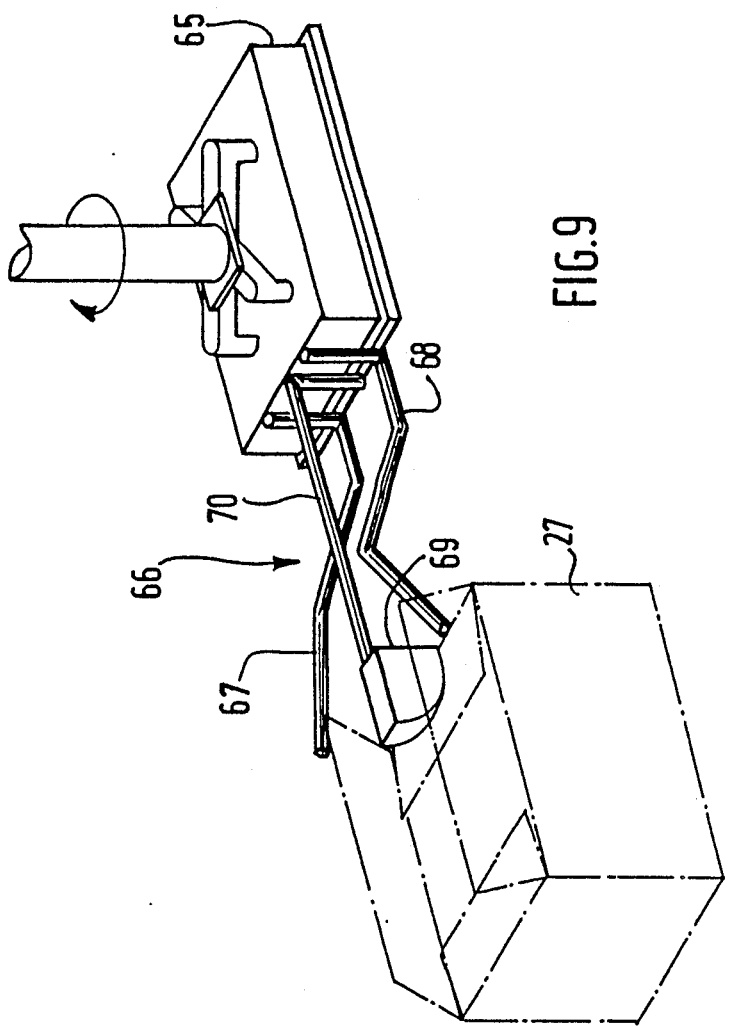
FIG. 9 is a view in perspective of another work head in accordance with the invention.

FIG. 9 represents another variant of the work head according to the invention comprising an axial suction device 65 carrying as a packaging tool a flap folding frame 66 disposed laterally similar to that in FIGS. 3 and 4 except that it comprises two rods 67 and 68 of suitable configuration and a finger 69 for folding the small sides carried by a third rod 70.

It will be understood that the foregoing description has been given by way of non-limiting example only and that numerous variants may be proposed by those skilled in the art without departing from the scope of the invention. Thus the disposition of the various stations around the robot of an installation according to the invention may be adapted to requirements and to the space available. The suction devices may be modified in their structure, geometry and reciprocal positions and may be replaced by other gripping devices (clamps, jaws ...).

In addition, the invention also concerns a packaging installation comprising:

a polar or cartesian robot comprising a work head equipped with a first packaging tool consisting of a gripping device, a number of packaging stations disposed in the space through which the head can move.

I claim:

1. A device for carrying out box handling and packaging operations comprising a support (20) and a gripping head comprising a horizontal arm (17) operatively connected to said support and a work tool situated on said arm wherein said horizontal arm (17) is adapted exclusively for moving transversely to itself, a carrying carriage, slidingly mounted on said arm (17), wherein said gripping head is mounted, for pivoting about a vertical axis and said handling and packing device further comprising:

a magazine (26) for storing boxes folded flat, accessible to the head, and a box filling station (22, 23) for filling packages.

2. A handling and packaging installation according to claim 28, further comprising stations for folding and sticking box flaps (35, 28, 61, 62, 64).

3. A handling and packaging installation according to claim 2, characterized in that the gripping head of the handling and packaging device further carriers an assembly for sticking or closing the flaps.

4. A device for carrying out box handling and packaging operations, comprising a support (16) and a gripping head comprising a shaft (2, 41) for connecting to this support and a work tool situated in the extension of this shaft, characterized in that:

said tool is adapted to carry out different gripping and handling operations on a package, and said tool (42) is articulated to the connecting shaft (41) while being controlled in rotation by a control means (43) causing said tool to be placed in different work positions so as to carry out different operations on the same package.

5. A handling and packaging device according to claim 4, characterized in that the articulated tool (42) is controlled for swinging by a jack (43).

6. A handling and packaging device according to claim 4, characterized in that the articulated tool (42) is a suction bell.

7. A handling and packaging device according to claim 6, characterized in that the suction bell (42) comprises, thereinside, individual gripping members (51).

8. A handling and packaging device according to claim 4, characterized in that said gripping head further comprises a packaging tool with a pair of divergent legs (49, 67, 68) and a device for closing the flaps of the boxes.

9. A handling and packaging device according to claim 4, characterized in that said gripping head carries a packaging tool formed by a sticking device (10, 46).

10. A handling and packaging installation according to claim 4, comprising several packaging stations assigned to operations of different kinds, and comprising a handling and packaging device, whose gripping head (40) is adapted to be brought to the position to each of these stations to there carry out the particular operation provided in each of them.

11. A handling and packaging installation according to claim 10, further comprising a palletization station 21.

* * * * *